(12) United States Patent
Philipp et al.

(10) Patent No.: US 11,474,244 B2
(45) Date of Patent: Oct. 18, 2022

(54) SYSTEM AND METHOD OF CONTROLLING OPERATION OF A DEVICE HAVING AN OPTICAL SENSOR

(71) Applicant: GM Global Technology Operations LLC, Detroit, MI (US)

(72) Inventors: Tzvi Philipp, Bet Shemesh (IL); Igai Bilik, Rehovot (IL); Shahar Villeval, Tel Aviv (IL)

(73) Assignee: GM Global Technology Operations LLC, Detroit, MI (US)

(*) Notice: Subject to any disclaimer, the term of this patent is extended or adjusted under 35 U.S.C. 154(b) by 855 days.

(21) Appl. No.: 16/385,744

(22) Filed: Apr. 16, 2019

(65) Prior Publication Data

US 2020/0333464 A1    Oct. 22, 2020

(51) Int. Cl.
| | | |
|---|---|---|
| *G01S 17/46* | (2006.01) | |
| *G01S 17/89* | (2020.01) | |
| *G01S 13/86* | (2006.01) | |
| *G01S 7/48* | (2006.01) | |
| *G01S 17/86* | (2020.01) | |

(52) U.S. Cl.
CPC ............ *G01S 17/46* (2013.01); *G01S 7/4808* (2013.01); *G01S 13/865* (2013.01); *G01S 17/86* (2020.01); *G01S 17/89* (2013.01)

(58) Field of Classification Search
CPC ...... G01S 17/46; G01S 7/4808; G01S 13/865; G01S 17/86; G01S 17/89; G01S 7/497; G01S 17/931; G01S 2013/93271; G01S 3/7862; G01S 17/42; B01C 21/28
See application file for complete search history.

(56) References Cited

U.S. PATENT DOCUMENTS

| | | | | |
|---|---|---|---|---|
| 5,553,661 A | * | 9/1996 | Beyerlein | B60H 1/00735 165/203 |
| 8,330,591 B2 | * | 12/2012 | Ziehr | B60H 1/0075 715/788 |
| 8,788,145 B2 | * | 7/2014 | Perugu | B60K 35/00 236/1 B |

\* cited by examiner

*Primary Examiner* — Marthe Y Marc-Coleman
(74) *Attorney, Agent, or Firm* — Quinn IP Law

(57) ABSTRACT

System and method of controlling operation of an optical sensor in a device. The optical sensor is configured to employ a scan pattern to scan respective portions of a full field of view. A navigation sensor is configured to obtain location coordinates of the device. An inertial sensor is configured to obtain an acceleration data of the device in a plurality of directions. A controller is configured to determine a position of the device at the present time based in part on the location coordinates and the acceleration data. The controller is configured to determine a sun striking zone based in part on a relative position of the sun and the device. When a sun overlap region between the respective portions of the full field of view and sun striking zone exceeds a first overlap threshold, operation of the optical sensor is modified.

17 Claims, 2 Drawing Sheets

SYSTEM AND METHOD OF CONTROLLING OPERATION OF A DEVICE HAVING AN OPTICAL SENSOR

INTRODUCTION

The present disclosure relates to a system and method of controlling operation of a device having an optical sensor. Optical sensor systems are often employed in automobiles and other transportation devices to provide a visual image of areas surrounding the devices. The devices may encounter bright light sources which may cause the optical sensors to be saturated and momentarily unable to perform measurements in the field of view of the optical sensor.

SUMMARY

Disclosed herein is a system and method of controlling operation of a device having at least one optical sensor. The optical sensor is operatively connected to the device and configured to employ a scan pattern to scan respective portions of a full field of view. The system includes a navigation sensor, such as a global positioning satellite (GPS) sensor, configured to obtain location coordinates of the device. An inertial sensor is configured to obtain an acceleration data of the device in a plurality of directions. A controller is operatively connected to the device and includes a processor and tangible, non-transitory memory on which instructions are recorded.

Execution of the instructions by the processor causes the controller to determine a position of the device at a present time, based in part on the location coordinates from the navigation sensor and the acceleration data from the inertial sensor. The controller is configured to determine a sun striking zone based on a relative position of the sun at the present time, the position of the device and a calendar date. The controller is configured to determine a sun overlap region between the respective portions of the full field of view and the sun striking zone at the present time. When the sun overlap region of at least one of the respective portions exceeds a first overlap threshold, operation of the optical sensor is modified. In one example, the first overlap threshold is at least 50% of at least one of the respective portions of the optical sensor.

The scan pattern may include scanning the respective portions of the full field of view for a respective dwell time in a predefined order. Modifying the operation of the optical sensor may include at least one of: changing the predefined order of the scan pattern such that the scanning of the at least one of the respective portions (i.e., the respective portion associated with the sun overlap region) is before or after the present time, reducing the respective dwell time and skipping the at least one of the respective portions (i.e., the respective portion associated with the sun overlap region).

The system may include a map database configured to store a planned route of the device and accessible to the controller. The controller may be configured to determine a projected position of the device at a future time based in part on the planned route and the position of the device at the present time. The controller may be configured to determine the sun striking zone (projected) based on the relative position of the sun at the future time, the projected position of the device and the calendar date. The controller may be configured to determine the sun overlap region (projected) between the respective portions of the full field of view and the sun striking zone at the future time. Operation of the optical sensor is modified when the sun overlap region (projected) exceeds the first overlap threshold at the future time. Additionally, the controller may receive external information pertaining to the weather conditions in the expected area the travel has been planned for, such as fog, rain, snow, sleet, with the external information improving the predictive performance of the system.

The system may include a radar unit configured to detect the relative position of an oncoming device emitting a light beam, and a photosensor configured to determine an intensity of the light beam. The controller may be configured to determine if the intensity exceeds a high beam threshold. When the intensity exceeds the high beam threshold, the controller may be configured to determine a beam overlap region between the respective portions of the full field of view and the light beam. The scan pattern is modified when the beam overlap region exceeds a second overlap threshold. In one example, the high beam threshold is selected to be between 60 Watts and 70 Watts, inclusive.

The above features and advantages and other features and advantages of the present disclosure are readily apparent from the following detailed description of the best modes for carrying out the disclosure when taken in connection with the accompanying drawings.

DETAILED DESCRIPTION

Figure 1:
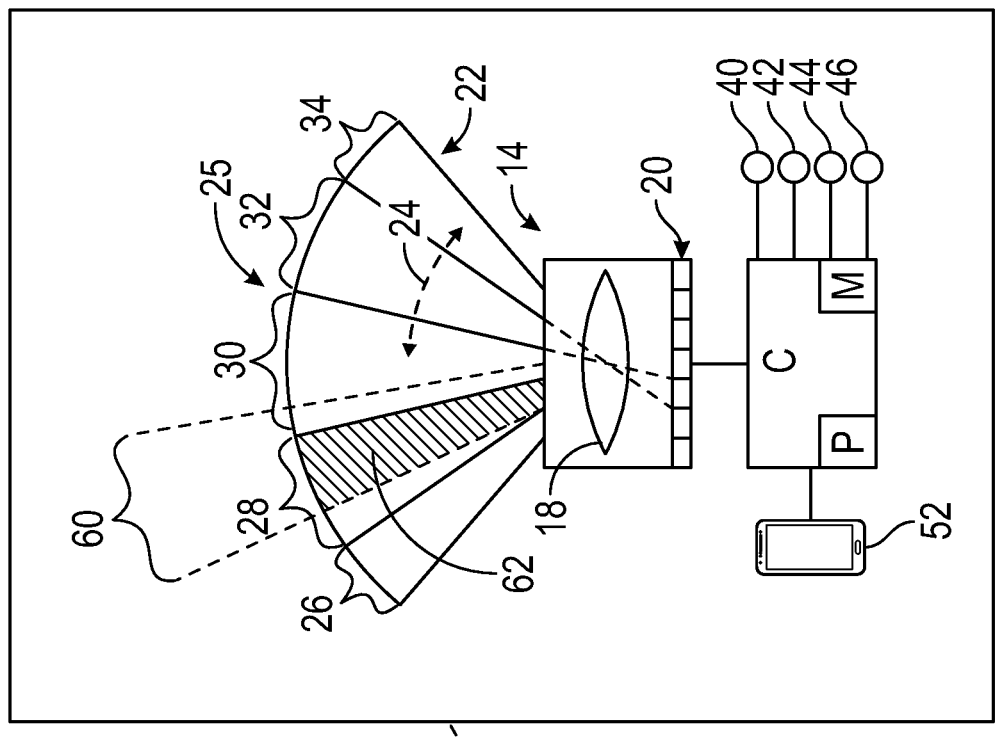
FIG. 1 is a schematic partly-perspective illustration of a system 10 for controlling operation of a device having at least one optical sensor and a controller.
Figure 1:
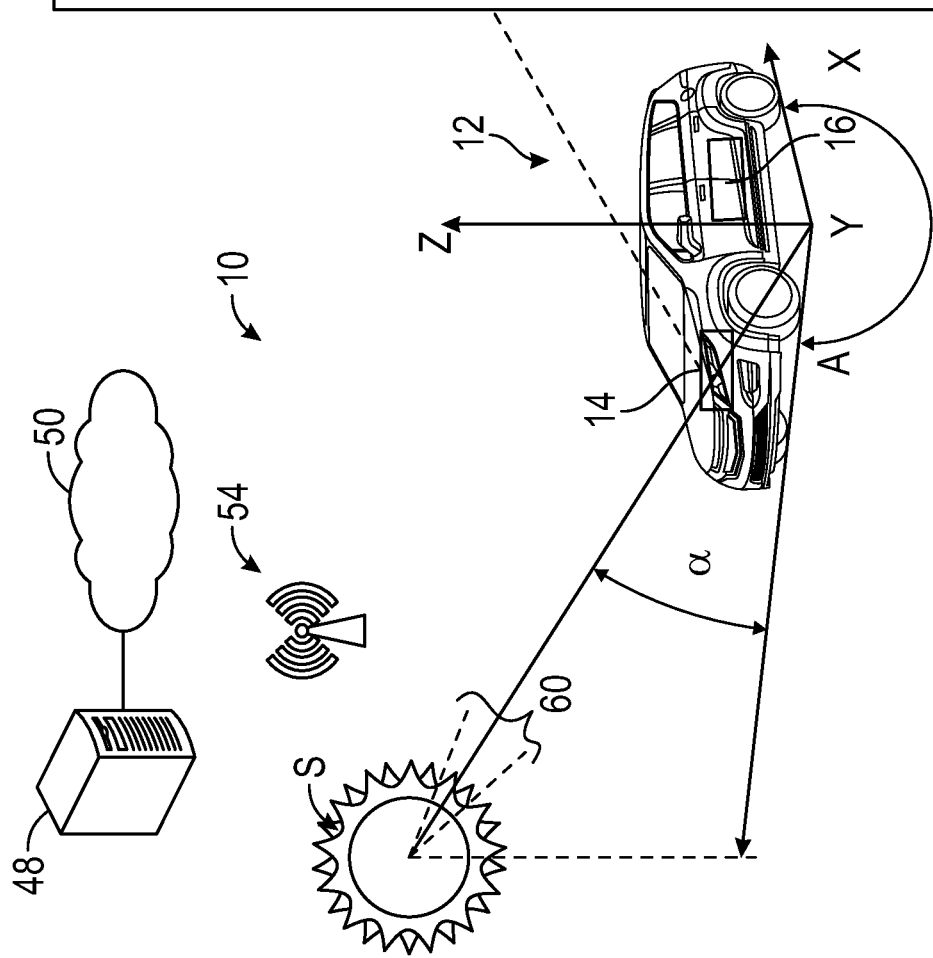

Referring to the drawings, wherein like reference numbers refer to like components, FIG. 1 schematically illustrates a system 10 for controlling operation of a device 12 in real-time. The device 12 includes at least one optical sensor 14 configured to provide an image about the device 12. The location of the optical sensor 14 on the device 12 may be varied based on the application at hand. The device 12 may include additional optical sensors, such as a second optical sensor 16 shown in FIG. 1. The device 12 may be a mobile platform such as, but not limited to, a passenger car, sport utility car, light truck, heavy duty truck, ATV, minivan, bus, transit vehicle, bicycle, robot, farm implement (e.g. tractor), sports-related equipment (e.g. golf cart), boat, airplane and train. The device 12 may take many different forms and include multiple and/or alternate components and facilities.

The optical sensor 14 is shown in greater detail in the inset of FIG. 1. The optical sensor 14 may be a camera employing photons in the visible and ultra-violet region of the electromagnetic spectrum. The optical sensor 14 may be a LIDAR sensor having solar illumination as a dominant limitation in the lidar range detection. In the example shown in FIG. 1, the optical sensor 14 includes a lens 18 and a plurality of detectors 20 configured to image a full field of view 22. The plurality of detectors 20 may be configured to provide an electrical signal based on respective irradiances on their respective active surfaces. The optical sensor 14 may include other components (not shown) available to those skilled in the art, such as for example, mirrors, dispersion devices, apertures, modulators and an integrated processing unit.

Referring to FIG. 1, a controller C is operatively connected to the device 12 and includes at least one processor P and at least one memory M (or non-transitory, tangible computer readable storage medium) on which are instructions are recorded for executing a method 100 of controlling operation of the device 12, described in detail below with respect to FIG. 3. The memory M can store controller-executable instruction sets, and the processor P can execute the controller-executable instruction sets stored in the memory M.

Referring to FIG. 1, the optical sensor 14 may be configured to employ a scan pattern 24 to scan the respective portions 25 of the full field of view 22 for a respective dwell time in a predefined order. The respective portions 25 may include a first portion 26, second portion 28, third portion 30, fourth portion 32 and a fifth portion 34. The respective portions 25 may have different sizes. The respective dwell time and the predefined order are controllable and may be dynamically adjusted by the controller C.

Referring to FIG. 1, the controller C may receive input from a plurality of sensors operatively connected to the device 12, such as for example, a navigation sensor 40, an inertial sensor 42, a radar unit 44 and a photosensor 46. Referring to FIG. 1, the navigation sensor 40, which may be a global positioning satellite (GPS) sensor, is configured to obtain location coordinates or location coordinates of the device 12, for example, latitude and longitude values. Referring to FIG. 1, the inertial sensor 42 is configured to obtain an acceleration data of the device 12 in a plurality of directions, for example acceleration ($a_x$, $a_y$, $a_z$) along an X axis, a Y axis and a Z axis (X axis and Z axis shown in FIG. 1, the Y axis goes out of the page). The inertial sensor 42 may include one or more accelerometers and one or more gyroscopes to determine linear acceleration and rotational rates, respectively. The inertial sensor 42 may include a magnetometer or other component available to those skilled in the art. For example, the inertial sensor 42 may include a respective accelerometer, gyroscope, and magnetometer (not shown) per axis for a pitch axis, a roll axis and a raw axis. As described below and referring to FIG. 1, the controller C uses the data generated by the navigation sensor 40 and inertial sensor 42 to determine the relative position, including the orientation, of the device 12 to the sun S.

Referring to FIG. 1, the controller C has access to or is in communication with a map database 48 and a cloud unit 50. The cloud unit 50 may be a public or commercial source of information available to those skilled in the art, such as for example, Google Earth. Alternatively, the map database 48 may be loaded onto the memory M of the controller C. The device 12 may be configured to receive and transmit wireless communication to the map database 48 and the cloud unit 50, through a mobile application 52 and a wireless network 54. The mobile application 52 may be integral with or physically connected (e.g. wired) to the controller C, such that it has physical access to the data in the controller C. The mobile application 52 may be built into and run on an infotainment system of the device 12. The circuitry and components of a cloud unit 50 and mobile application 52 ("apps") available to those skilled in the art may be employed.

Figure 2:
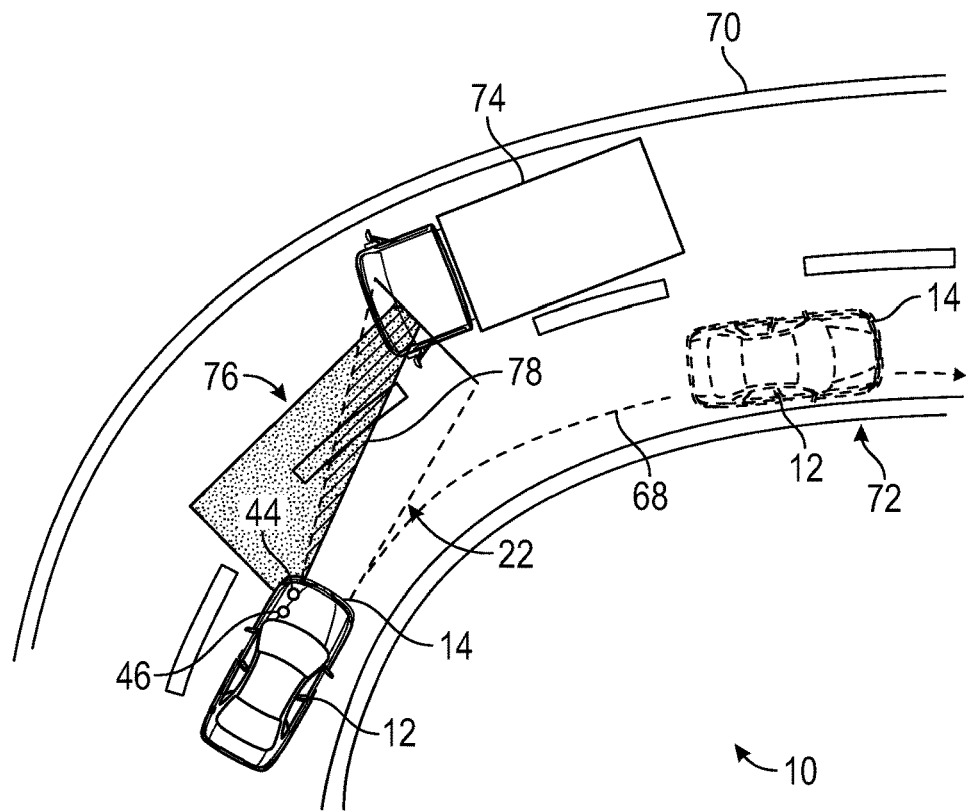
FIG. 2 is a schematic top view of the device of FIG. 1, illustrating a planned route along a surface.

FIG. 2 is a schematic top view of the device 12, illustrating a planned route 68 of the device 12 along a surface 70. The map database 48 (see FIG. 1) is configured to store the planned route 68 of the device 12. The controller C may be configured to determine a projected position 72 of the device 12 at a future time based in part on the planned route 68 and the position of the device 12 at the present time. Additionally, the controller C may receive external information pertaining to the weather conditions in the expected area the travel has been planned for, such as fog, rain, snow, sleet, (for example through the cloud unit 50), the external information improving the predictive performance of the system 10.

Referring to FIG. 2, the radar unit 44 is configured to detect the relative position of an oncoming vehicle 74 emitting a light beam 76 (stippled in FIG. 2). Referring to FIG. 2, the photosensor 46 is configured to determine an intensity of the light beam 76. The radar unit 44 may include multiple embedded components (not shown), such as a transmitter producing electromagnetic waves in the radio or microwave domain, a transmitting antenna, a receiving antenna, a receiver and an integrated processor. The electromagnetic waves reflect off an object, such as vehicle 74 in FIG. 2 and return to the radar unit 44, providing information about the location and speed of the vehicle 74. The radar data may include a radial distance (r) of the vehicle 74 from the device 12, a relative angle and a range rate (dr/dt). The photosensor 46 may include one or more photocells, such as light-responding silicon chips, that convert incident radiant energy into electrical current, as well as corresponding circuitry.

The optical sensor 14 of FIGS. 1-2 may be saturated by directly viewing a bright source of light. Referring to FIG. 1, one example of a bright source of light is the sun S, particularly at low angles in the early morning hours or evening. Due to the Earth's orbit around the sun S and the Earth's rotation around its tilted axis, the angle at which sunlight strikes the Earth varies by location, time of day, and season. Referring to FIG. 2, another example of a bright light source is the oncoming vehicle 74 with a light beam 76 of high intensity directed towards the optical sensor 14. Method 100 is configured to reduce the occurrence of a saturation event by adapting the scan pattern 24 dynamically to adjust to the environmental conditions encountered by the device 12. The controller C (via execution of method 100) is configured to determine if the respective portions 25 of the full field of view 22 of the optical sensor 14 will include imaging the sun S and/or a light beam 76 of high intensity directly and dynamically adapt the scan pattern 24 accordingly.

Figure 3:
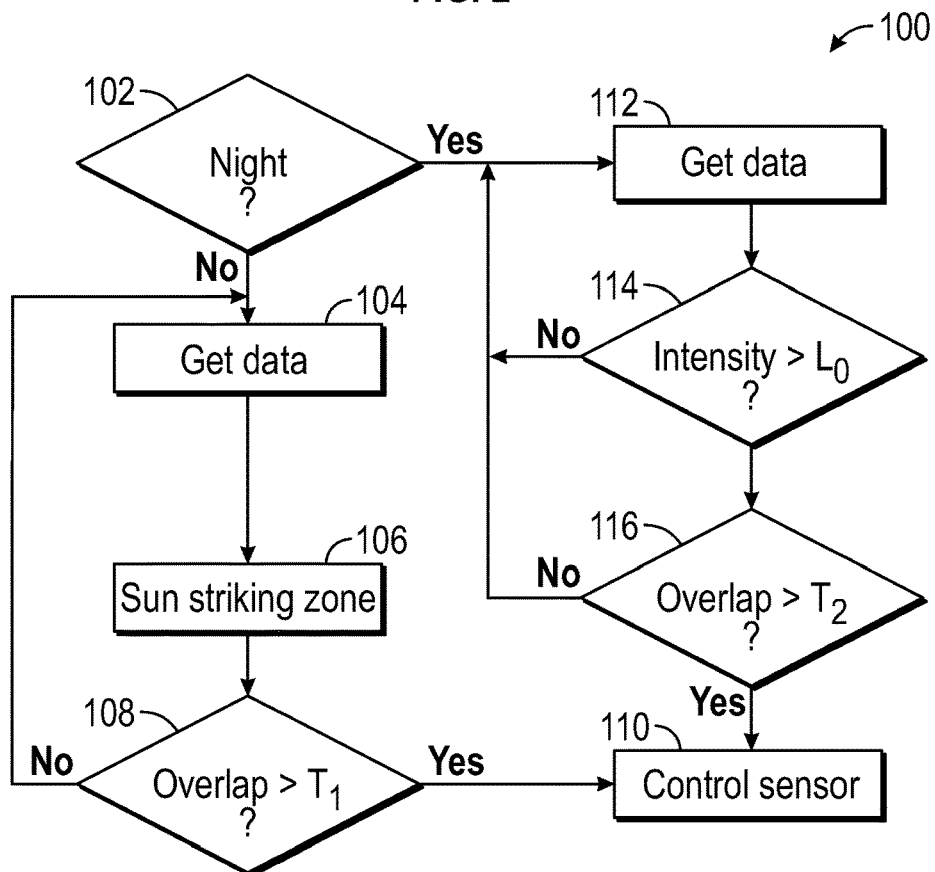
FIG. 3 is a schematic flow diagram for a method executable by the controller of FIG. 1.

Referring now to FIG. 3, a flowchart of the method 100 stored on and executable by the controller C of FIG. 1 is shown. Method 100 need not be applied in the specific order recited herein. Furthermore, it is to be understood that some steps may be eliminated. Per block 102 of FIG. 3, the controller C may be programmed to determine if the present time is nighttime, which may be defined as the time of darkness or between sunset and sunrise. Alternatively, the controller C may be programmed to determine if the present time is daytime, which may be defined as the time when the sun S is visible or between sunrise and sunset.

If it is not nighttime (and is daytime), the method 100 proceeds to block 104. Per block 104, the controller C is programmed to obtain data from the navigation sensor 40 and the inertial sensor 42 at the present time, and determine a position of the device 12 at the present time based in part on the location coordinates and the acceleration data. The method 100 proceeds to block 106 from block 104. The position of the device 12 includes the orientation (e.g. which way it is facing) of the device 12. The orientation of the optical sensor 14 may be obtained from the orientation of the device 12 and where the optical sensor 14 is fixedly mounted on the device 12. If there are multiple optical sensors, the orientation of each optical sensor is similarly obtained and analysis conducted for each (as described below).

Per block 106, the controller C is programmed to determine a sun striking zone 60 based on a relative position of the sun S at the present time, the position of the device 12 at the present time and a calendar date. The sun striking zone 60 may be defined as a continuous 3-D region or cone where the intensity of the incident solar rays exceeds a predefined minimum, measured via the photosensor 46. The environmental analysis of block 106 may be continuously updated by the device 12.

Referring to FIG. 1, the relative position of the sun S (relative to a point on the Earth's surface) may be specified in terms of a zenith angle (a), an azimuth angle (A) and a reference line from the sun S to an origin of an XYZ coordinate system (X axis and Z axis shown in FIG. 1, the Y axis goes out of the page). The zenith angle (a) may be defined as between the reference line and a plane (X-Y plane in this case) parallel to the Earth's surface. The azimuth angle (A) may be defined between a reference axis (X axis in the case) and a projection of the reference line on the plane (X-Y plane in this case) parallel to the Earth's surface. An example program to determine the relative position of the sun S is available from the National Oceanographic and Atmospheric Administration's website (https://www.esrl.noaa.gov/gmd/grad/solcalc/). Other methods available to those skilled in the art may be employed.

Per block 108, the controller C is configured to determine a sun overlap region 62 between the respective portions 25 of the full field of view 22 (from the position and the orientation of the optical sensor 14 in block 104) and the sun striking zone 60 (from block 106) at the present time. Per block 108, the controller C is programmed to determine if a sun overlap region 62 of at least one of the respective portions 25 is at or above a first overlap threshold ($T_1$ in FIG. 3). If so, the method 100 proceeds to block 110 of FIG. 3. If not, the method 100 loops back to block 104. In one example, the first overlap threshold is defined to be at or above 50% of at least one of the respective portions 25 of the optical sensor 14. In the example shown in FIG. 1, the sun overlap region 62 of the second portion 28 exceeds the first overlap threshold.

Per block 110 of FIG. 3, the controller C is configured to control or modify operation of the optical sensor 14, including modifying the scan pattern 24 to avoid saturation exposures of optical sensor 14. Modifying the scan pattern 24 may include changing the predefined order such that the scanning of the respective portion associated with the sun overlap region 62 is before or after the present time. Modifying the scan pattern 24 may include reducing the respective dwell time of the respective portion associated with the sun overlap region 62. Modifying the scan pattern 24 may include skipping the respective portion associated with the sun overlap region 62. Other modifications may be made, for example, disabling the optical sensor 14.

Referring back to block 102, if it is nighttime, the method 100 proceeds to block 112. Per block 112, the controller C is programmed to determine the relative position of an oncoming vehicle 74 (see FIG. 2) emitting a light beam 76, via the radar unit 44 and determine an intensity of the light beam 76, via the photosensor 46. The method 100 proceeds to block 114. Per block 114, the controller C is configured to determine if the intensity of the light beam 76 exceeds a high beam threshold ($L_0$ in FIG. 3). If so, the method 100 proceeds to block 116. In one example, the high beam threshold ($L_0$ in FIG. 3) is between 2 Watts and 40 Watts, inclusive. In another example, the high beam threshold ($L_0$ in FIG. 3) is about 20 Watts.

Per block 116 of FIG. 3 and referring to FIG. 2, the controller C is programmed to determine the extent of the light beam 76 based on a relative position and orientation of the oncoming device 74. Per block 116, the controller C is programmed to determine a beam overlap region 78 (hatched in FIG. 2) between the field of view 22 of the optical sensor 14 and the light beam 76. If the beam overlap region 78 exceeds a second overlap threshold ($T_2$ in FIG. 3), the method 100 proceeds to block 110, where the controller C is programmed to control operation of the optical sensor 14, as described above. In one example, the second overlap threshold ($T_2$ in FIG. 3) is greater than the first overlap threshold ($T_1$ in FIG. 3).

Additionally, per block 104 of FIG. 3, the controller C may be configured to determine the projected position 72 (see FIG. 2) of the device 12 at a future time, based in part on the planned route 68 (see FIG. 2) and the position of the device 12 at the present time. Per block 106 of FIG. 3, the controller C may be configured to determine the sun striking zone 60 (projected) based on the relative position of the sun S at the future time, the projected position 72 of the device 12 at the future time and the calendar date. Referring to FIG. 1, the controller C may be configured to determine the sun overlap region 62 (projected) of the respective portions 25 of the optical sensor 14 and the sun striking zone 60 at the future time. Operation of the optical sensor 14 is modified when the sun overlap region 62 (projected) of one of the respective portions 25 exceeds the first overlap threshold ($T_1$ in FIG. 3).

In summary, the system 10 improves the functioning of the device 12 by combining the location coordinates of the device 12 on the earth's surface, time, date (day, month year), the relative position of the sun S in the sky, the inertial directions of acceleration of the device 12 and the intensity of a light beam 76 from an oncoming vehicle 74 to maximize the efficiency of the optical sensor 14 in the daytime and the nighttime. This efficiency of the optical sensor 14 at a future time may be maximized by obtaining the expected route 68 of the device 12 (e.g. from the map database 48) to obtain a projected position 72 of the device 12 at a future time.

The controller C of FIG. 1 may be an integral portion of, or a separate module operatively connected to, other controllers of the device 12. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling operation of a device, the system comprising:
    at least one optical sensor operatively connected to the device and configured to scan respective portions of a full field of view for a respective dwell time in a predefined order, according to a scan pattern;
    a controller operatively connected to the device and including a processor and tangible, non-transitory memory on which instructions are recorded;
    a navigation sensor in communication with the controller and configured to obtain a location coordinates of the device;
    an inertial sensor in communication with the controller and configured to obtain an acceleration data of the device in a plurality of directions;
    wherein execution of the instructions by the processor causes the controller to:
        determine a position of the device at a present time based in part on the location coordinates from the navigation sensor and the acceleration data from the inertial sensor;
        determine a sun striking zone based on a relative position of a sun at the present time, the position of the device and a calendar date;
        determine a sun overlap region between the respective portions of the full field of view and the sun striking zone at the present time; and
        modify operation of the at least one optical sensor when the sun overlap region of at least one of the respective portions exceeds a first overlap threshold, including changing the predefined order of the scan pattern such that the scanning of the at least one of the respective portions is delayed.

2. The system of claim 1, wherein the first overlap threshold is at least 50% of the at least one of the respective portions of the full field of view.

3. The system of claim 1, wherein:
    modifying the operation of the at least one optical sensor includes reducing the respective dwell time of the at least one of the respective portions.

4. The system of claim 1, wherein:
    modifying the operation of the at least one optical sensor includes skipping the scanning of the at least one of the respective portions.

5. The system of claim 1, further comprising:
    a map database configured to store a planned route of the device, the map database being accessible to the controller;
    wherein the controller is configured to:
        determine a projected position of the device at a future time based in part on the planned route and the position of the device at the present time;
        determine the sun striking zone based on the relative position of the sun at the future time, the projected position of the device and the calendar date;
        determine the sun overlap region between the respective portions of the full field of view and the sun striking zone at the future time; and
        modify operation of the at least one optical sensor when the sun overlap region of one of the respective portions exceeds the first overlap threshold at the future time.

6. The system of claim 1, further comprising:
    a radar unit configured to detect a relative position of an oncoming device emitting a light beam;
    a photosensor configured to determine an intensity of the light beam;
    wherein the controller is configured to:
        determine if the intensity exceeds a high beam threshold;
        when the intensity exceeds the high beam threshold, determine a beam overlap region between the respective portions of the full field of view and the light beam; and
        modify the operation of the at least one optical sensor when the beam overlap region of one of the respective portions exceeds a second overlap threshold.

7. The system of claim 6, wherein:
    modifying the operation of the at least one optical sensor includes at least one of:
        changing the predefined order of the scan pattern such that the scanning of the at least one of the respective portions is delayed,
        reducing the respective dwell time of the at least one of the respective portions, and
        skipping the scanning of the at least one of the respective portions.

8. The system of claim 6, wherein the high beam threshold is between 60 Watts and 70 Watts, inclusive.

9. A method of controlling operation of a device in real-time, the device having at least one optical sensor, a navigation sensor, an inertial sensor and a controller including a processor and tangible, non-transitory memory on which instructions are recorded, the method comprising:
    configuring the at least one optical sensor to scan respective portions of a full field of view for a respective dwell time in a predefined order, according to a scan pattern;

obtaining a location coordinates of the device via the navigation sensor;

obtaining an acceleration data of the device in a plurality of directions via the inertial sensor;

determining a position of the device at a present time based in part on the location coordinates and the acceleration data;

determining a sun striking zone based on a relative position of a sun at the present time, the position of the device and a calendar date;

determining a sun overlap region between the respective portions of the full field of view and the sun striking zone at the present time; and modifying operation of the at least one optical sensor when the sun overlap region of at least one of the respective portions exceeds a first overlap threshold, including skipping the scanning of the at least one of the respective portions.

10. The method of claim 9, wherein the first overlap threshold is at least 50% of the at least one of the respective portions of the full field of view.

11. The method of claim 9, further comprising:
modifying the operation of the at least one optical sensor by changing the predefined order of the scan pattern such that the scanning of the at least one of the respective portions is delayed.

12. The method of claim 9, further comprising:
modifying the operation of the at least one optical sensor by reducing the respective dwell time of the at least one of the respective portions.

13. The method of claim 9, further comprising:
accessing a map database via the controller, the map database being configured to store a planned route of the device;

determining a projected position of the device at a future time based in part on the planned route and the position of the device at the present time;

determining the sun striking zone based on the relative position of the sun at the future time, the projected position of the device and the calendar date;

determining the sun overlap region between the respective portions of the full field of view and the sun striking zone at the future time; and modifying operation of the at least one optical sensor when the sun overlap region of one of the respective portions exceeds the first overlap threshold at the future time.

14. The method of claim 9, wherein the device includes a radar unit and a photosensor, the method further comprising:
configuring the radar unit to detect a relative position of an oncoming device emitting a light beam;

determining if an intensity of the light beam exceeds a high beam threshold, via the photosensor;

when the intensity exceeds the high beam threshold, determining a beam overlap region between the respective portions of the full field of view and the light beam; and modifying the operation of the at least one optical sensor when the beam overlap region of one of the respective portions exceeds a second overlap threshold.

15. The method of claim 14, further comprising:
modifying the operation of the at least one optical sensor by at least one of:
changing the predefined order of the scan pattern such that the scanning of the at least one of the respective portions is delayed,
reducing the respective dwell time of the at least one of the respective portions, and
skipping the scanning of the at least one of the respective portions.

16. The method of claim 14, further comprising:
selecting the high beam threshold as between 60 Watts and 70 Watts, inclusive.

17. A system for controlling operation of a device, the system comprising:
at least one optical sensor operatively connected to the device and configured to scan respective portions of a full field of view for a respective dwell time in a predefined order, according to a scan pattern;

a controller operatively connected to the device and including a processor and tangible, non-transitory memory on which instructions are recorded;

a navigation sensor in communication with the controller and configured to obtain a location coordinates of the device;

an inertial sensor in communication with the controller and configured to obtain an acceleration data of the device in a plurality of directions;

wherein execution of the instructions by the processor causes the controller to:
determine a position of the device at a present time based in part on the location coordinates from the navigation sensor and the acceleration data from the inertial sensor;
determine a sun striking zone based on a relative position of a sun at the present time, the position of the device and a calendar date;
determine a sun overlap region between the respective portions of the full field of view and the sun striking zone at the present time; and
modify operation of the at least one optical sensor when the sun overlap region of at least one of the respective portions exceeds a first overlap threshold, including skipping the scanning of the at least one of the respective portions.

* * * * *